United States Patent [19]

Roess et al.

[11] 3,852,684

[45] Dec. 3, 1974

[54] LASER DEVICE COMPRISING A COMPOUND OSCILLATOR AND AMPLIFIER FOR GENERATING THE FUNDAMENTAL MODE

[75] Inventors: Dieter Roess, Planegg; Guenter Ziedler, Unterpfaffenhofen, both of Germany

[73] Assignee: Siemens Aktiengesellschaft, Berlin and Munich, Germany

[22] Filed: Apr. 4, 1973

[21] Appl. No.: 347,781

[30] Foreign Application Priority Data
Apr. 28, 1972 Germany ............................ 2221057

[52] U.S. Cl. .............................................. 331/94.5
[51] Int. Cl. ............................................. H01s 3/08
[58] Field of Search ................... 331/94.5; 356/106

[56] References Cited
UNITED STATES PATENTS

| | | | |
|---|---|---|---|
| 3,622,907 | 11/1971 | Tomlinson et al. | 331/94.5 |
| 3,753,147 | 8/1973 | Schulthess | 331/94.5 |

Primary Examiner—William L. Sikes
Attorney, Agent, or Firm—Hill, Gross, Simpson, Van Santen, Steadman, Chiara & Simpson

[57] ABSTRACT

In a laser device for generating a laser beam of a fundamental mode having an oscillator portion and an amplifying portion characterized by the pair of mirrors forming the resonator of the oscillator being dimensioned to utilize only a portion of the laser active material and matching optical systems arranged with the laser active material for directing a beam decoupled from the resonator back through the laser active material for amplification of the beam.

8 Claims, 7 Drawing Figures

LASER DEVICE COMPRISING A COMPOUND OSCILLATOR AND AMPLIFIER FOR GENERATING THE FUNDAMENTAL MODE

BACKGROUND OF THE INVENTION

1. Field of the Invention

The present invention relates to a laser device comprising a combination laser oscillator and amplifier for generating a laser beam having a fundamental mode.

2. Prior Art

In many laser devices, particularly solid state laser device, the light, which is radiated from the device, is not radiated in the form of a well defined wave of limited diffraction for example in the fundamental mode. Instead, the radiation patterns includes modes of higher transverse order with zero points and secondary lobes which modes and lobes cause an overall higher angular divergence of the beam being emitted by the device.

In some technical applications of a laser device, for example in machining material, holography and in optical direction finding systems, it is important that the beam of the laser light should be radiated in the form of a well defined wave having the smallest possible angular divergence. A laser beam having the smallest possible angular divergence is only produced if the light excited in the laser resonator is purely the fundamental mode.

Various methods have been suggested for selecting or obtaining the fundamental mode in a laser device. One example, of a proposed method of mode selection is the intervention of an isolating means in the optical resonator. With each of these known methods of mode selection, a substantial reduction in the output power of the beam occurs. In high power laser devices, mode selection may also result in the destruction of heavily loaded components.

In high powered laser devices, a problem, which has not yet been satisfactorily resolved, is to provide a method for obtaining a beam of radiation in the fundamental mode which beam contains the whole of the energy which is available in the laser oscillator and stored in the inverted laser material. Since the intervention in the resonator can only produce a beam of the fundamental mode having a very low power, a conventional procedure is to arrange one or more laser amplifiers with the laser device for amplifying the beam emitted thereby. However, in these proposals, only a fraction of the energy stored in the oscillator is utilized.

SUMMARY OF THE INVENTION

The present invention is directed to a laser device for generating a laser beam having a fundamental mode which device has a substantially improved efficiency and involves a lower technical outlay for equipment. To accomplish the improved efficiency, the device uses a portion of a laser active material as the oscillator and the remaining portion as an amplifier so that the energy stored in the laser material is fully exploited. Thus, the components, which include the pumping means and its power supply for exciting the active material of the oscillator, also stimulate the same active material which is used as an amplifier. The laser device of the present invention comprises a laser active material, a pair of mirrors arranged with respect to the material and having a dimension to form an optical resonator utilizing a portion of the laser active material with the remaining portion of the material being an amplifier portion, one of the pair of mirrors being partially transparent to the light to enable decoupling of the beam from the resonator and a matching optical system including means for directing a laser beam decoupled from the optical resonator portion through the amplifier portion of the laser active material for amplification. In several embodiments of this device, the laser active material is a rod of homogeneous structure and the mirrors are of a dimension to form the oscillator on an axial portion of the rod with a coaxially surrounding portion of the rod acting as the amplifier. In these embodiments, the mirrors may be either flat plane mirrors to form a plane-parallel resonator or two confocal mirrors to form a confocal resonator with a Fresnel number in the order of magnitude of 1. Preferably, the output coupling factor of the optical resonator will be so high that the laser threshold is only exceeded at a very high gain per transit. In one embodiment of the invention, a pair of mirrors are utilized in the matching optical system to reflect the radiation decoupled from the resonator through the amplifier portion at least twice prior to decoupling the amplified beam from the device.

DESCRIPTION OF THE PREFERRED EMBODIMENTS

Figure 1:
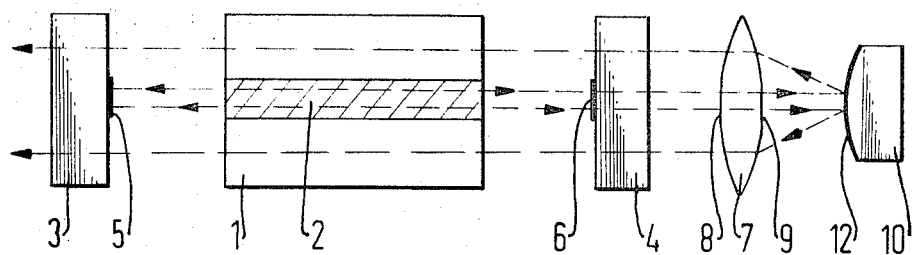
FIG. 1 is an embodiment of a laser device of the present invention with a matching optical system which device has a plane-parallel resonator.

The principles of the present invention are particularly useful in a laser device schematically illustrated in FIG. 1. The device includes a body 1 of laser active material which is preferably a symmetrically cylindrical rod of uniform solid state laser material which can be optically pumped. To pump the rod or body 1 of laser active material, a conventional pumping arrangement (not illustrated) is arranged with the rod 1 between a pair of transparent mirror supports 3 and 4 which have their surfaces facing the body 1 coated with an anti-reflecting material. A plane mirror 5, which has a reflection factor of 1, is disposed on a coated surface of the support 3 to face the body 1 and a second mirror 6, which is partially transparent or permeable to light, is arranged on a coated surface of the support 4 to face the body 1. The pair of mirrors 5 and 6 form a plane-parallel Fabry-Perot resonator and are of a dimension so that only a portion 2 of the body or rod 1 of solid state laser active material 1 is utilized as the oscillator portion or section of the resonator. As illustrated, the portion 2 is an axial portion of the rod forming the body 1 and the remaining portion of the active material of rod 1 which remaining portion is coaxially surrounding the oscillator 2 is utilized as an amplifier portion.

A matching optical system, which has a rotational symmetry, includes a condensing lens 7, which has a flat lens center with two flat parallel faces 8 and 9. The diameter of the parallel faces 8 and 9 corresponds to the diameters of the two mirrors 5 and 6. A convex mirror 12 is disposed on a support or mount 10 and insures that the beam of radiation decoupled through the mirror 6 of the resonator, as illustrated in broken lines, is returned through the remaining portion of the rod 1 of laser material. As illustrated, the convex mirror 12 reflects the beam back through the lens 7 and the matching optical system coacts to direct the light on the whole of the cross section area of the amplifier portion and to traverse the length of the amplifier portion with a light beam being a well defined and virtually flat wave. As the light beam traverses the amplifier portion, it is amplified and is then decoupled through the transparent mirror support 3 for subsequent use.

Figure 2:
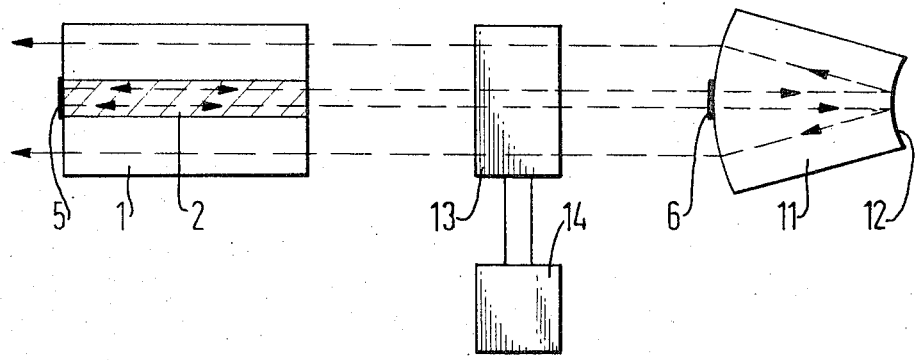
FIG. 2 is an embodiment of a laser device according to the present invention having a plane-parallel resonator and using an embodiment of a matching optical system.

Another embodiment of the device is illustrated in FIG. 2 with the same element numbers being utilized to identify the parts which are the same as in the embodiment of FIG. 1. In the embodiment of FIG. 2, the mirror 5, which has a reflection factor of one is applied to an end surface of the rod 1. The partially transparent mirror 6 is formed by a flat, polished portion of a convex surface of a transparent body or element 11 which body has rotational symmetry and which body 11 forms the matching optical system. As in the previous embodiment, the mirrors 5 and 6 form a plane-parallel resonator with as oscillator portion 2 which is an axial portion of a rod 1 which portion 2 is axially surrounded by a remaining portion which acts as the amplifier portion. The body 11 opposite the surface on which the mirror 6 is formed has a convex mirror 12' which reflects the beam of light decoupled through the mirror 6 back through the body 11 to traverse the amplifier portion of the rod 1 of active material. The refraction of the body 11 coacts with the mirror 12' so that the whole cross sectional area of the amplifier portion is utilized as the beam traverses the length of the rod 1. The light after passing through the amplifier portion of the body 1 is decoupled from the device through the end surface of the rod 1 which surface supports the mirror 5. If desirable, a modulator 13 is disposed between the rod of active material 1 and the partially permeable mirror 6. The modulator is connected by leads to a control unit 14 as illustrated and can be utilized to modulate the beam.

Figure 3:
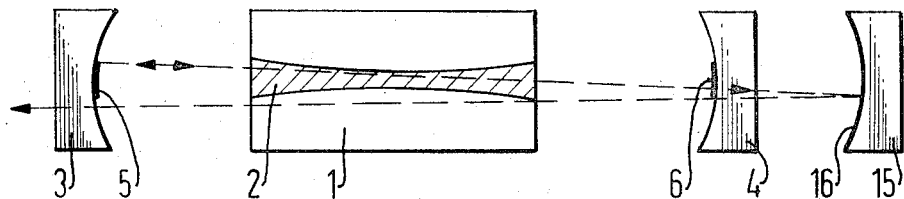
FIGS. 3, 4, 5 and 6 are different embodiments of a laser device of the present invention having a confocal resonator and utilizing various structural embodiments of the matching optical system.

In FIG. 3, an embodiment of the device having a confocal resonator is illustrated. The device includes a symmetrical rod of active material 1, as in the previously described embodiments, which rod 1 is disposed between a pair of mirror supports 3' and 4' having a rotational symmetry. The supports 3' and 4' have spherical concave surfaces facing the end of the rod 1 which surfaces are provided with a mirror 5' and 6', respectively. The mirror 5' has a reflection factor of one while the mirror 6' is partially permeable or transparent to the light beam. The pair of mirrors 5' and 6' form a confocal resonator and are dimensioned to utilize only a portion 2' on the rod 1 as the oscillator. As in the embodiment of FIGS. 1 and 2, the portion 2' is an axial portion. The remaining portion of the rod 1 is the amplifier portion or section and axially surrounds the portion 2'. The matching optical system includes a support or element 15 having a spherical concave mirror 16 for reflecting radiation decoupled through the mirror 6' back through the support 4' to traverse the amplifier portion of the rod 1. The support 4' and mirror 16 coact by refraction and reflection to direct the beam to traverse the amplifier portion in the desired manner for amplification. As the beam traverses the amplifier portion, it is then decoupled from the device through the transparent support 3'.

Figure 4:
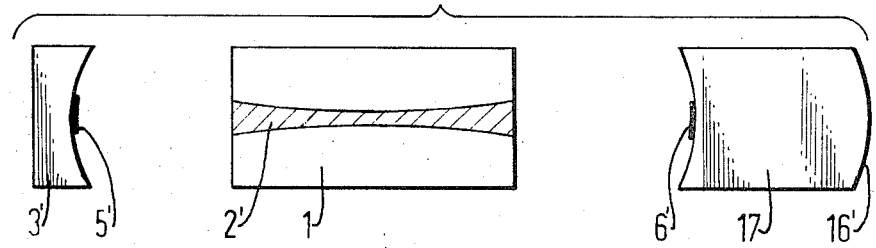

In the embodiment illustrated in FIG. 4, the partially transparent mirror 6' is disposed on a spherical concave surface of a transparent body 17 which body has a second or opposite surface provided with a concave mirror 16'. Thus, light decoupled from the confocal resonator through the mirror 6' is reflected by the mirror 16' and refracted by the transparent body 17 to be directed through the amplifier portions of the laser active material 1. As the light traverses the amplifier portion, it is amplified and then decoupled from the device through the transport support 3'.

Figure 5:
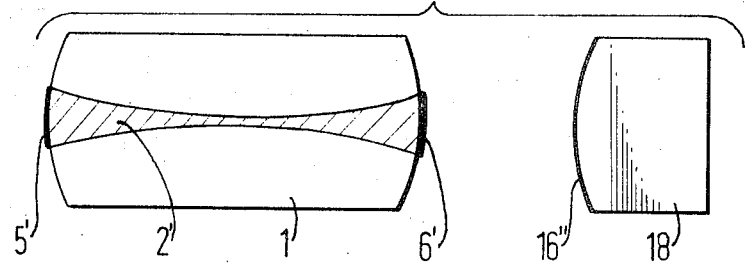
Figure 6:
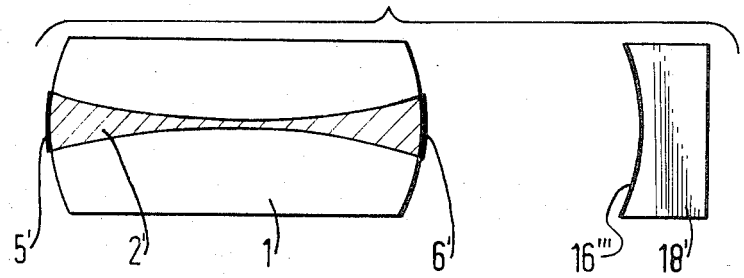

In the embodiments of FIGS. 5 and 6, the end surfaces or terminal portions of the rod 1 of laser active material are provided with spherical curved surfaces which support the pair of mirrors 5' and 6'. In the embodiment of FIG. 5, the matching optical system includes a support 18 which has spherically curved surface for supporting a mirror 16''. The support 18 locates the mirror 16'' to receive a beam of light decoupled through the mirror 6' of the resonator and to reflect the light back through the amplifier portion of the rod 1 of laser active material. As in the previous case, the light beam traversing through the amplifier portion is amplified and then decoupled through the end surface of the rod 1 which surface supports the mirror 5'.

In the embodiment illustrated in FIG. 6, the matching optical system includes a support 18' which has a concave surface that supports a concave mirror 16'''. As in the previous embodiments, the support 18' is located with respect to the mirror 6' so that the mirror 16''' reflects light decoupled from the resonator through the partially transparent mirror 6' back through the amplifier portion of the active material.

Figure 7:
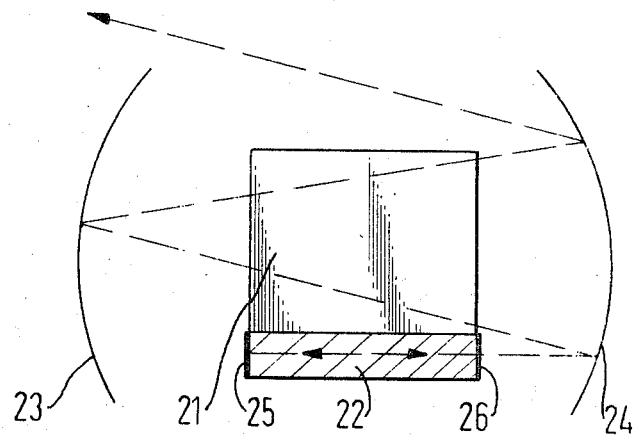
FIG. 7 is another embodiment of the present invention utilizing a matching optical system of two mirrors.

In the embodiment illustrated in FIG. 7, a body 21 of amplifying laser active material is flat or linear in form, as for example in a laser diode. In this case, a fiber-shaped zone or portion 22 is provided with small mirrors 25 and 26 to form an oscillator for the resonator. The remaining portion of the laser active material 21 is utilized as an amplifier portion. A matching optical system comprises a pair of mirrors 23 and 24. The body 21 containing the portion 22 is arranged between the mirrors 23 and 24 so that the light decoupled through a partially transparent mirror 26 is reflected by the mirror 24 back through the amplifier portion of the laser active material to the mirror 23 which then reflects the beam back through the amplifier portion a second time towards the mirror 24 which then decouples the amplified beam from the device by reflecting the beam therefrom. In this device, the optical system of the two mirrors 23 and 24, which could also utilize dielectric wave guides, obtains a multiple traversal of the light beam through the amplifier portion to obtain amplification of the beam.

In the embodiments using a confocal resonator, such as the embodiments of FIGS. 3-4, it should be insured that the resonator has a Fresnel number in the order of magnitude of one. With such a Fresnel number, the higher modes will then experiece an increase refraction loss compared with the fundamental mode and thus cannot be excited close to the threshold value. The output coupling factor of the oscillator section or portion should then be selected with such a magnitude that the laser threshold value is exceeded only at a high gain per transit and thus only the fundamental mode generated. It is only by satisfying these conditions that the further exploitation of the same laser material as a subsequent amplifier is advantageous. In the case of lasers which are pumped in a spatially non-uniform manner, if the laser oscillator utilizes a more weakly pumped zone of the material, the effect of high gain in the ensuing amplifier portion can be reinforced near the oscillator threshold.

In addition to obtaining a greater exploitation of the energy in the laser material and thus an improved efficiency, the laser device of the present invention enables the production of a device which has relatively small dimensions. While in the conventional fundamental mode lasers, a long resonator or a telescope with a long focal length was required, the laser device, in accordance with the present invention, has an oscillator section which can be made physically small by a suitable restriction of the amplifying volume.

Although various minor modifications might be suggested by those versed in the art, it should be understood that we wish to employ within the scope of the patent warranted herein all such modifications as reasonably and properly come within the scope of our contribution to the art.

We claim:

1. A laser device for generating and amplifying a laser of a fundamental mode, comprising a body of laser active material, an optical resonator including a pair of mirrors with the body of laser active material being positioned therebetween, said pair of mirrors having their cross sectional dimension less than the cross sectional dimension of the laser active material so that only a portion of the laser active material coacts with the pair of mirrors to form a fundamental mode oscillator with the remaining portion of the body of material being an amplifier portion, one of said pair of mirrors being partially transparent to decouple a beam from the resonator, and means being positioned to receive the beam decoupled from the resonator through the one mirror and to direct the decoupled beam through the amplifier portion of the laser active material for amplification of the beam.

2. A laser device according to claim 1, wherein the body of laser active material is a rod of homogeneous structure having an axis, said pair of mirrors being positioned on said axis of the rod so that an axial portion of the rod forms the fundamental mode oscillator and the coaxial surrounding remaining portion of the rod forms the amplifier portion.

3. A laser device according to claim 2, wherein the pair of mirrors are plane mirrors and form a plane-parallel resonator.

4. A laser device according to claim 3, wherein the means comprises a condenser lens and a convex mirror, said condenser lens has a pair of parallel flat faces of a cross sectional size corresponding to the cross sectional dimensions of the mirrors of the plane-parallel resonator and is positioned adjacent the one mirror with the faces axially aligned with the rod so that a beam decoupled through the one mirror passes through the plane faces of the lens, said convex mirror being positioned to receive a decoupled beam passing through the parallel faces of the lens and to reflect the beam back through the lens and the amplifier portion of the laser active material.

5. A laser device according to claim 3, wherein the means comprises a light transmitting body having a convex surface on which the one mirror of the pair of mirrors is provided, said light transmitting body being provided on a second surface with a convex mirror for reflecting light decoupled by the one mirror back through the amplifier portion.

6. A laser device according to claim 2, wherein the two mirrors forming the resonator are two confocal mirrors and the resonator has a Fresnel number having a magnitude in the order of one.

7. A laser device according to claim 6, wherein the means includes a mirror for reflecting light emitted by the one mirror of the resonator back through the amplifier portion.

8. A laser device according to claim 1, wherein the means comprises a pair of spaced concave mirrors with the optical resonator disposed therebetween so that the pair of concave mirrors reflect the light beam decoupled through the one mirror of the resonator through the amplifier portion of the body of laser active material at least two times prior to decoupling of the beam from the device.

* * * * *